April 28, 1964
E. H. HUEGEL ETAL
3,130,533
RAKE
Filed April 25, 1962
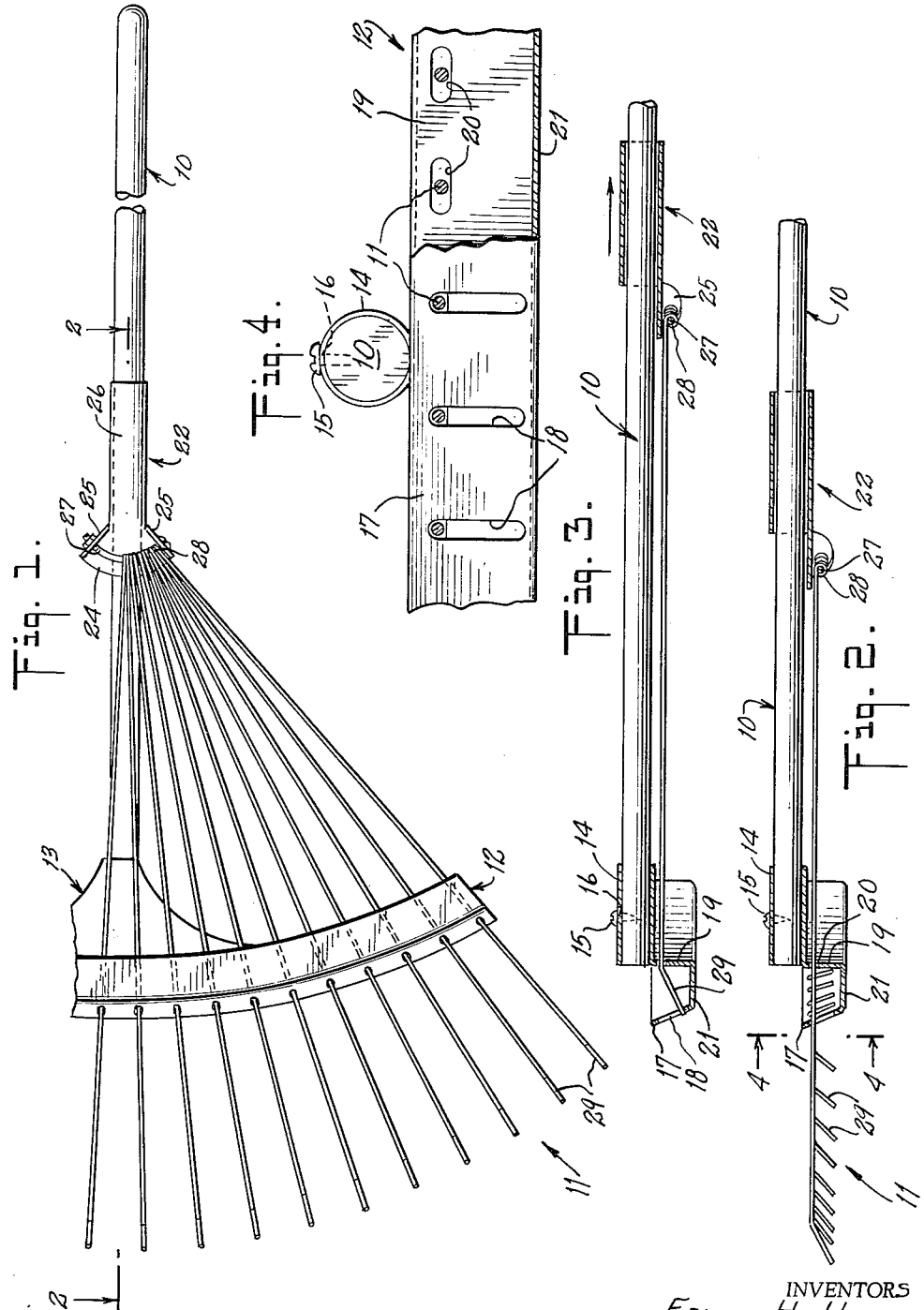
INVENTORS
EDWIN H. HUEGEL &
BY JOHN B. MURPHY
Krazinski & Nolan
ATTORNEYS

United States Patent Office 3,130,533
Patented Apr. 28, 1964

3,130,533
RAKE
Edwin H. Huegel, 120 Hackensack Ave., Harrington Park, N.J., and John B. Murphy, 103 Midwood Ave., Allendale, N.J.
Filed Apr. 25, 1962, Ser. No. 190,083
7 Claims. (Cl. 56—400.17)

The present invention relates to gardening implements and, more particularly, to an improved leaf and grass gathering rake of the self cleaning type.

Heretofore, rakes have been used for gathering leaves and cut blades of grass which rakes have radiating tines arranged like a fan or a sector of a circle. Such rakes are very popular and desirable because of their light weight and ease to handle and because they do not inflict damage to a lawn from which leaves or blades of grass are being removed by digging into the soil. However, such rakes have a tendency to become clogged with leaves and blades of grass which necessitates frequent cleaning of the rake to maintain the raking action thereof efficient. While attempts have been made to provide means co-acting with the tines of the rake to effect so-called self cleaning thereof, such attempts have not been successful and satisfactory.

Accordingly, an object of the present invention is to provide an improved self cleaning rake of the radiating tine type which overcomes the difficulties and objections heretofore encountered.

Another object is to provide such a rake wherein means are provided for effectively stripping leaves and blades of grass from the tines.

Another object is to provide such a rake which is light in weight and has stripping means which do not interfere with the normal operation of the rake.

A further object is to provide such a rake which is simple, practical and economical in construction.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

FIG. 1 is a fragmentary bottom plan view of about one-half of a rake in accordance with the present invention illustrating the tines in their normal position.

FIG. 2 is a side view of the rake taken substantially along the line 2—2 on FIG. 1.

FIG. 3 is a view similar to FIG. 2 illustrating the operation of the means for stripping leaves and blades of grass from the tines.

FIG. 4 is an enlarged fragmentary sectional view taken along the line 4—4 on FIG. 2 illustrating details of the stripping means.

Referring now to the drawing in detail, there is shown a rake which generally comprises a handle 10, a plurality of radiating tines 11 and a stripping bar 12. The tines 11 and the bar 12 are constructed, arranged and mounted for movement with respect to each other on the handle 10 to effect cleaning of the rake in the manner about to be described.

The handle 10 is an elongated rod-like member of conventional length and diameter and may be constructed of wood, metal or plastic resin tubing or of any suitable material.

The bar 12 is an arcuate, channel-shaped member which is secured at about the middle thereof to the forward or lower end of the handle 10. Such securement may be effected by providing the bar with a bracket 13 having an offset tubular portion 14 into which the handle 10 extends and by providing one or more screws 15 which extend through an aperture 16 in the portion 14 and are screwed into the handle (FIGS. 2 to 4).

In accordance with the present invention, the bar 12 includes an arcuate front wall 17 provided with a row of spaced, generally vertical slots 18, an arcuate back wall 19 depending from the bracket 13 and provided with a row of spaced apertures or horizontal slots 20 each in alignment with the upper end of a slot 18 (FIG. 4), and a web 21 interconnecting the walls 17 and 19 at the lower edges thereof. The front wall 17 preferably is inclined upwardly and forwardly for the purpose to be described hereinafter.

The tines 11 are mounted on the handle 10 by a member 22. This member has a sector shaped head 24 at its underside formed with side walls 25, and has a sleeve portion 26 slidably mounted on the handle 10 inwardly or upwardly of the bar 12. The tines 11 are attached to the member 22 by an arcuate bolt 27 which passes through eyes 28 at the upper or inner ends of the tines and which is secured to and between the side walls 25.

The tines 11, the bar 12 and the member 22 may be formed of metal or plastic resin or any other suitable material.

The bar 12 and the member 22 are arranged so that the tines are underneath the handle 10 when the rake is in use.

The tines 11 extend forwardly or downwardly from the member 22 and pass through the apertures 20 and the slots 18. The free ends of the tines have a depending portion 29 (FIGS. 2 and 3) which is inclined forwardly and downwardly, that is, in the opposite direction the front wall 17 is inclined.

The foregoing described arrangement enables the tines 11 to normally assume the position shown in FIGS. 1 and 2 with the free ends of the tines extending forwardly or downwardly of the bar 12 for gathering leaves, grass and the like. When it is desired to clean the tines to strip gathered material caught therebetween, the handle 10 is held in one hand and the member 22 is grasped with the other hand and is slid upwardly or inwardly along the handle to the position shown in FIG. 3. As this takes place, the tines slide through the slots 18 and 20, and the depending portions 29 at the end of this movement pass through the slots 18 to complete the stripping operation.

Such stripping is facilitated by inclining the front wall 17 and the depending portions 29 in opposite directions, so that the portions 29 are substantially perpendicular to the wall 17 as they pass through the slots 18 (FIG. 3), whereby the front face of the wall 17 is effective to hold the material to be stripped while the depending portions are retracted. In this manner, there is a minimum tendency of material gathered by the tines to become wedged between the tines 11 and the bar 12, whereby the stripped material falls freely from the rake when stripped and frequent manual cleaning of the tines is unnecessary. After stripping, the tines are returned to the position shown in FIGS. 1 and 2.

In practice, it has been found that the tines can be operated in a convenient manner by forming the bar 12 on a radius which is about three times as great as the length of the portions of the tines which normally extend forwardly of the bar (FIGS. 1 and 2). For example, a radius of about eighteen inches allows the member 22 to be operated through a stroke of about six inches. The end of the retracting or inward movement of the member is determined by the rear end of the tine portions 29 contacting the forward face of the back wall 19 (FIG. 3), with the front ends of the portions 29 still projecting forwardly of the bar 17. The normal position of the tines is established by the wedging action of the tines in the slots 18 and 20, as the tines fan out when the member 22 is moved forwardly or outwardly on the handle 10. This wedging action also serves to maintain the tines in their working position but is readily overcome when the member 22 is retracted.

From the foregoing description, it will be seen that the present invention provides an improved rake of the self cleaning type which is simple and economical in construction and is practical and reliable in operation.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A rake comprising a handle, an arcuate rake cleaning bar fixedly secured to one end of said handle and having spaced aperture means thereon, a member slidably mounted on said handle inwardly of said bar, and a plurality of tines secured at one end thereof to said member and radiating from said member towards said bar and passing through said aperture means, said tines being translatorily movable with said member.

2. A rake comprising a handle; an arcuate rake cleaning bar fixedly secured to one end of said handle, said bar having an arcuate front wall provided with spaced vertical slots and having an arcuate back wall provided with spaced apertures in alignment with the upper end of said slots; a member slidably mounted on said handle inwardly of said bar; and a plurality of tines mounted at one end thereof on said member and radiating from said member towards said bar and passing through said slots and apertures, said tines being translatorily movable with said member and each of said tines having a depending portion at the free ends thereof adapted to enter said slots upon movement of said member away from said bar.

3. A rake according to claim 2, wherein means for mounting said tines on said member include an eye at the mounted end of each of said tines and an arcuate bolt passing through said eyes and secured to said member.

4. A rake according to claim 2, wherein a portion of said tines extends forwardly of said front wall and said bar has a radius about three times as great as the length of said forwardly extending tine portion.

5. A rake according to claim 2, wherein said depending portions are inclined forwardly and downwardly and said front wall is inclined forwardly and upwardly.

6. A rake according to claim 5, wherein said front wall is spaced from said back wall a greater distance than said depending tine portions extend forwardly.

7. A rake according to claim 2, wherein said spaced apertures are constituted by horizontal slots.

References Cited in the file of this patent

UNITED STATES PATENTS

| | | |
|---|---|---|
| 2,713,763 | Holman et al. | July 26, 1955 |
| 2,797,544 | Fite | July 2, 1957 |